(12) United States Patent　(10) Patent No.: US 6,394,303 B1
Ball　(45) Date of Patent: May 28, 2002

(54) LID GRIP

(76) Inventor: David John Ball, 6-1525 Boundary Crescent, Nanaimo, B.C. (CA), V9S 4P1

( * ) Notice: Subject to any disclaimer, the term of this patent is extended or adjusted under 35 U.S.C. 154(b) by 0 days.

(21) Appl. No.: 09/507,696

(22) Filed: Feb. 22, 2000

(30) Foreign Application Priority Data

Mar. 4, 1999　(CA) ............................................. 2264425

(51) Int. Cl.[7] .............................................. B65D 90/12
(52) U.S. Cl. ........................ 220/735; 16/425; 220/700
(58) Field of Search ........................ 220/694, 695–700, 220/735; 16/422, 425

(56) References Cited

U.S. PATENT DOCUMENTS

| | | | | |
|---|---|---|---|---|
| 2,040,750 A | * | 5/1936 | Long | 220/694 X |
| 2,284,901 A | * | 6/1942 | Hill | 220/700 |
| 2,625,299 A | * | 1/1953 | Uhlig | 220/736 |
| 2,647,523 A | * | 8/1953 | Vollender, Jr. | 220/735 |
| 2,777,596 A | * | 1/1957 | Puvogel | 220/694 |
| 5,377,863 A | * | 1/1995 | Widman | 220/696 |
| 5,933,876 A | * | 8/1999 | Simonds | 16/422 |

* cited by examiner

*Primary Examiner*—Lee Young
*Assistant Examiner*—Joseph C. Merek

(57) ABSTRACT

The lid holding apparatus is a device that holds a lid at a tilt on a pot to prevent the contents of the pot from boiling over.

7 Claims, 2 Drawing Sheets

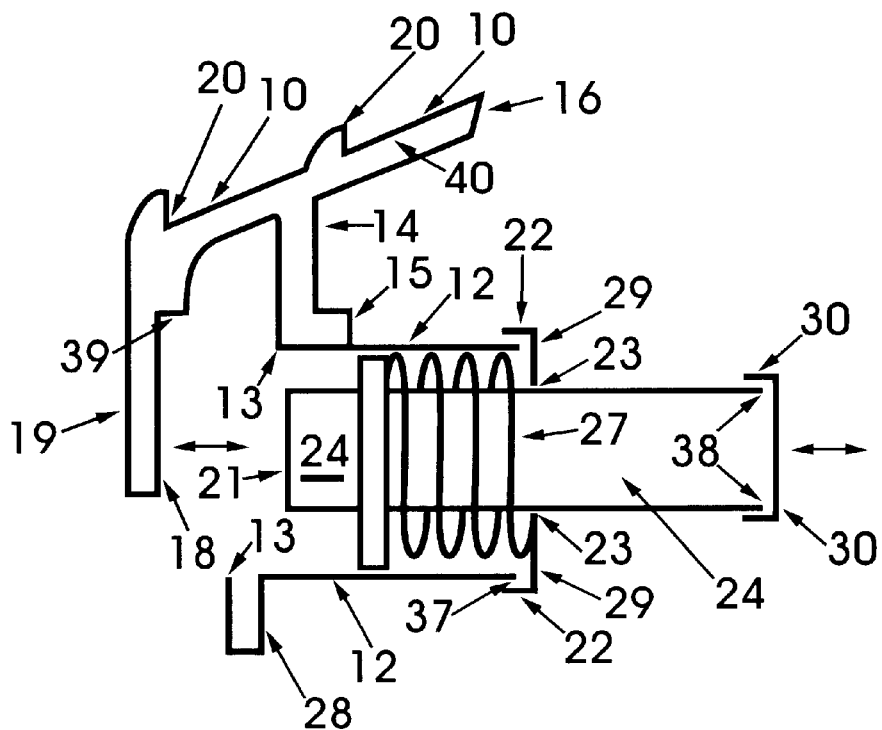
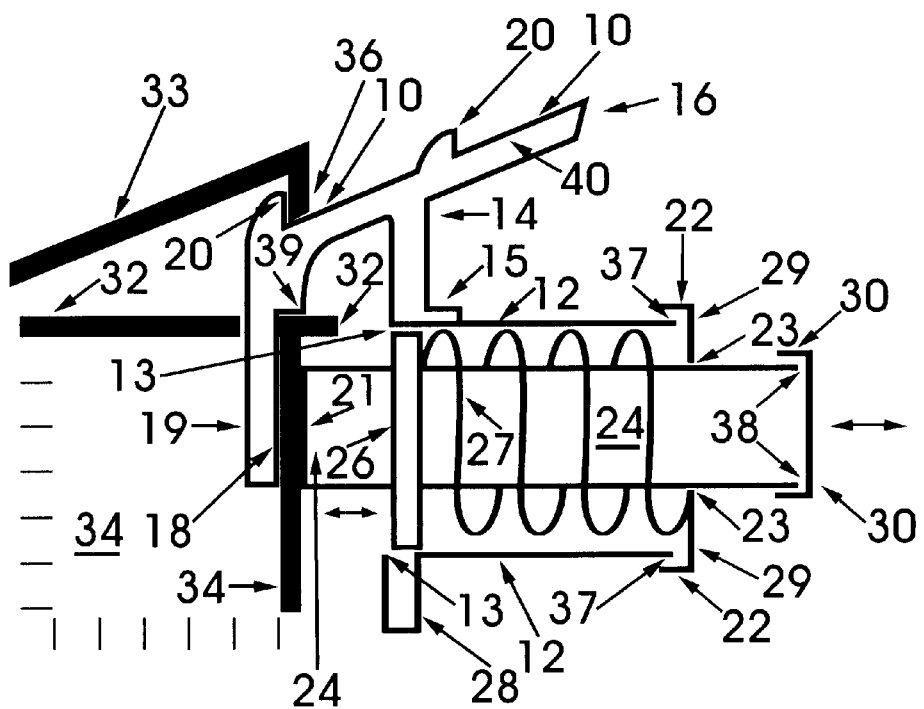

LID GRIP

BACKGROUND OF THE INVENTION

Often a pot will boil over if left unattended with the lid on, or when a lid, tilted on the pot, slips back on the pot rim.

My device allows one side of the lid to be held on an arch above the pot rim. The arch is held above the pot rim by an arm brace extending down from the front of the arch, the arm brace held against the inside of the pot by a rod, under spring pressure, against the outside of the pot, the rod and spring contained in a cylinder attached to the bottom of the arch.

BRIEF DESCRIPTION

The lid holding apparatus is a device that holds a lid at a tilt on a pot to prevent the contents of the pot from boiling over.

BRIEF DESCRIPTION OF THE DRAWINGS

In drawings which illustrate embodiments of the invention,

FIG. 6 is a side view showing the rod pulled back against a spring in the cylinder, FIG. 7 shows a side view of the tilted lid being held over the pot rim on the arch.

DETAILED DESCRIPTION

Figure 1:
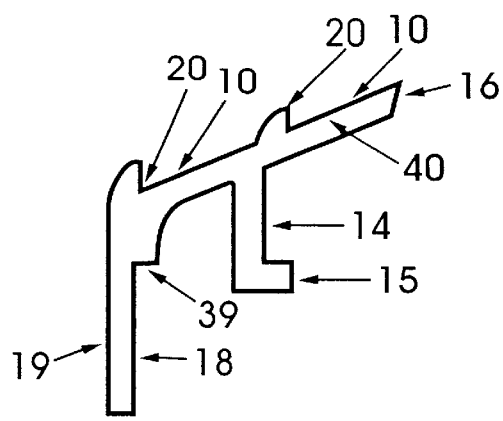
FIG. 1 is a side view showing the arch.
Figure 2:
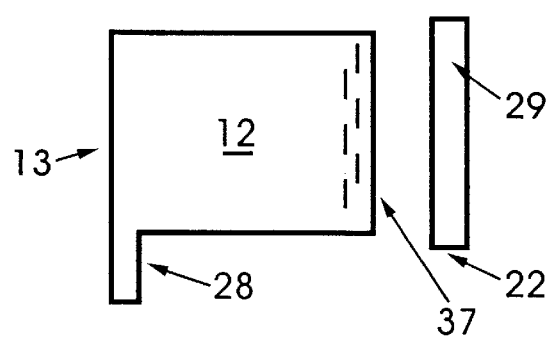
FIG. 2 is a side view of the cylinder and the cylinder cap.
Figure 3:
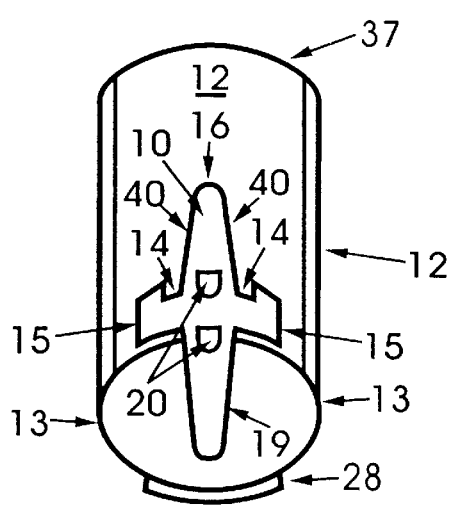
FIG. 3 is a view looking over the front of the cylinder showing the arch on top of the cylinder with the arm brace in front of the cylinder face.
Figure 4:
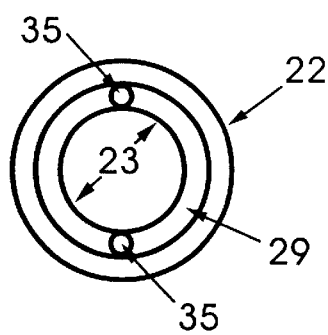
FIG. 4 is a front view of the cylinder cap.
Figure 5:
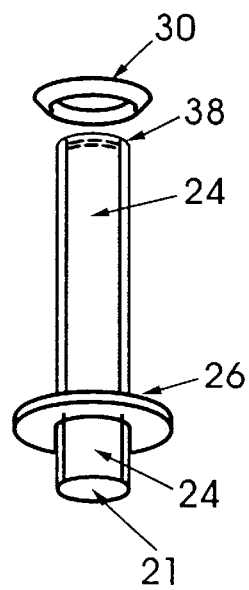
FIG. 5 is a view of the rod and the rod finger grip.

In FIG. 1 is a side view of the arch (16), showing the arch angling down to the arch legs (14), which extend from the arch sides (40), the legs extending into feet (15). The back of the arch (10), supports the arch steps (20), while the front of the arch extends into an arm brace (19), extending downwards, with the face of the arm brace (18), having a lip (39), facing inwards. FIG. 2 is a side view of the cylinder (12), and the cylinder cap (29). The cylinder is a tube open at both ends, the front or face end (13), having a finger guard (28), along its bottom edge, while the back end (37), is threaded to allow the sides of the cap (22), to be screwed on. FIG. 3 is a front view looking over the arch (16) raised above the cylinder (12), by the arch legs (14), extending from the arch sides (40), and molded by the arch feet (15), to the cylinder top at the face end (13). The arch back (10), is supporting the arch steps (20), while the arm brace (19), extends down from the front of the arch over the cylinder face (13), while the finger guard (28), is shown along the bottom of the face, and the back end of the cylinder is (37). FIG. 4 shows a front view of the cylinder cap (29), which will hold a spring, while (23) shows the hole for the rod movement, the holes (35), are to let any air pressure escape, and (22), shows the cap side. FIG. 5 is a view of the rod (24), and the rod finger grip (30). The rod face is slightly curved (21), to fit against a pot's side and the end of the rod (38), is threaded to enable the finger grip (30), to be screwed on, and the rod collar (26), is to control the pressure of a coil spring, and to guide the rod in the cylinder. FIG. 6 is a side view of the assembled embodiments which show the arch (16), raised at an angle above the cylinder (12), by the arch legs (14), extending from the arch sides (40), and molded by the leg feet (15), to the cylinder top at the cylinder face (13). The arch back (10), is shown supporting the arch steps (20), and the arm brace is shown extending over the cylinder face (13), the inside of the arm brace (18), having a lip attachment (39). Back and forth movement of the rod face (21), in the gap, the space between the front of the arm brace (18), and the cylinder face (13), is shown by the arrow. The rod collar (26), attached to the rod (24), is shown pulled back against the spring (27), and the end of the spring against the cylinder cap (29), the cap side (22), is threaded onto the cylinder end (37). The finger guard (28), is shown along the bottom of the cylinder face. FIG. 7 is a side view of the assembled embodiments showing a tilted lid (33), being held above a pot rim (32), on an arch (16), by means of the lid lip. (36), sitting on the arch back (10), and resting against the arch step (20), which prevents the lid from slipping back on the pot. The arch angles down to the arch legs (14), extending from the arch sides (40), the legs having feet (15), molded to the top of a cylinder (12). An arm brace (19), extends from the arch over the cylinder face (13). The arm brace face (18), has a lip attachment (39), which sits on the pot rim (32), to steady the arm brace. The arm brace face (18), is shown held against the inside of the pot (34), opposite the rod face (21), which is held against the outside of the pot by the force of a coil spring (27), against a rod collar (26), molded around a rod (24). The spring is contained in the cylinder, under pressure, by the rod collar and by a cylinder cap (29), which is screwed onto the end of the cylinder (37), by the cap sides (22). The rod extends through the cylinder cap hole (23), and the rod end is threaded (38), so the finger grip (30), can be screwed on for ease of handling. The cylinder face has a finger guard (28), along its lower edge to prevent the hand from slipping forward. The arrows indicate the direction of rod movement. When the rod is pulled back a gap opens; the space between the arm brace face and the cylinder face, allowing the pot to be mounted or dismounted.

The lid holding apparatus is assembled by placing the rod in the cylinder and the spring around the rod. The cylinder cap is now screwed on. The rod finger grip (30), is then screwed onto the end of the rod (38). The reverse is done for any necessary cleaning.

The spring will be made of steel, and all other parts made of plastics or any suitable heat resistant materials.

The embodiments of the invention in which an exclusive property or privilege is claimed are as follows:

What is claimed is:

1. A lid holding apparatus for holding a lid over the mouth of a container, said apparatus comprising:

a first body having first, second and third arms, wherein the arms form a generally prone "F" shaped body, the first arm being the longest arm forming the spine of the body, the second arm being shorter than the first arm and forming the outside leg of the body and the third arm being shorter than the second arm and forming the middle leg of the body;

said spine having a plurality of lugs in spaced relationship on a top surface thereof, the lugs adapted to receive the inside rim of a lid;

a second body attached to the middle leg of the first body, said second body having a rod therein, said rod being biased toward said second arm for holding said container between said second arm and said rod.

2. The apparatus of claim 1, wherein the second and third arms are positioned sufficient distance apart from each other to permit the rim of a container to pass therebetween.

3. The apparatus of claim 2, wherein the second arm includes a shoulder for accepting the rim of a container thereon.

4. The apparatus of claim 3, wherein the second boy is a hollow cylinder.

5. The apparatus of claim 4, wherein the second body has a first end adjacent the middle arm, said rod having a collar thereon, said collar being adjacent a first end of said rod, said rod having a spring theraround, said spring being between said collar and a second end of said second body.

6. The apparatus of claim 5, wherein the second body includes a threaded cap threaded onto the second end of the second body, said cap having an aperture allowing the rod passage therethrough.

7. The apparatus of claim 6, wherein the second end of said rod has a cap threaded thereto, said cap having an outside diameter larger than an outside diameter of said rod.

* * * * *

UNITED STATES PATENT AND TRADEMARK OFFICE
CERTIFICATE OF CORRECTION

PATENT NO. : 6,394,303 B1
DATED : May 28, 2002
INVENTOR(S) : David John Ball

It is certified that error appears in the above-identified patent and that said Letters Patent is hereby corrected as shown below:

Column 3,
Line 4, please change "4. The apparatus of claim 3, wherein the second boy is a hollow cylinder," to
-- 4. The apparatus of claim 3, wherein the second body is a hollow cylinder. --

Signed and Sealed this

Eighteenth Day of March, 2003

JAMES E. ROGAN
*Director of the United States Patent and Trademark Office*